United States Patent [19]
Ohta et al.

[11] Patent Number: 5,610,997
[45] Date of Patent: Mar. 11, 1997

[54] IMAGE PROCESSING METHOD AND APPARATUS

[75] Inventors: Takatoshi Ohta, Yokohama; Nobuo Ohnuma, Kawasaki, both of Japan

[73] Assignee: Canon Kabushiki Kaisha, Tokyo, Japan

[21] Appl. No.: 426,633

[22] Filed: Apr. 21, 1995

Related U.S. Application Data

[63] Continuation of Ser. No. 97,047, Jul. 27, 1993, abandoned.

[30] Foreign Application Priority Data

Jul. 28, 1992 [JP] Japan .................................. 4-201397
Jul. 31, 1992 [JP] Japan .................................. 4-205415

[51] Int. Cl.$^6$ .............................. G06K 9/68; G03F 3/08
[52] U.S. Cl. ...................... 382/218; 382/162; 382/305; 358/518; 358/523
[58] Field of Search .................................. 382/162, 199, 382/218, 266, 219, 269, 307, 305; 358/515, 518, 519, 520, 523, 524

[56] References Cited

U.S. PATENT DOCUMENTS

| | | | |
|---|---|---|---|
| 4,578,701 | 3/1986 | Nakaji | 358/524 |
| 4,682,216 | 7/1987 | Sasaki et al. | 358/79 |
| 4,739,397 | 4/1988 | Hayashi | 358/80 |
| 4,958,219 | 9/1990 | Kadowaki | 358/75 |
| 5,021,876 | 6/1991 | Kurita et al. | 358/450 |
| 5,060,060 | 10/1991 | Udagawa et al. | 358/80 |
| 5,081,527 | 1/1992 | Naito | 358/518 |
| 5,119,185 | 6/1992 | Ikeda et al. | 358/75 |
| 5,126,838 | 6/1992 | Ohsawa et al. | 358/75 |
| 5,132,788 | 7/1992 | Hirota | 358/518 |
| 5,177,603 | 1/1993 | Kojima | 358/518 |
| 5,216,231 | 6/1993 | Ouchi | 235/463 |

FOREIGN PATENT DOCUMENTS 452159  6/1990  Japan .................. B41J 2/525

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

There is disclosed an image processing system including a first memorizing means for storing information according to input data, a second memorizing means for storing output signals obtained by performing processes of a plurality of procedures for input data, comparison means for comparing new input data with immediately preceding input data which has been stored in the first memorizing means, and switching means for switching in accordance with the output from the comparison means if the processes of the plurality of procedures are performed to output data, or if the data stored in the second memorizing means are output.

16 Claims, 8 Drawing Sheets

| INDEX NUMBER | RED | GREEN | BLUE |
|---|---|---|---|
| 0 | 0 | 0 | 0 |
| 1 | 42 | 42 | 42 |
| 2 | 84 | 84 | 84 |
| 3 | 127 | 127 | 127 |
| . | . | . | . |
| . | . | . | . |
| . | . | . | . |
| 254 | 255 | 255 | 213 |
| 255 | 255 | 255 | 255 |

FIG. 7

| ADDRESS | CONTENT |
|---|---|
| 0000 | $C_0$ |
| 0001 | $M_0$ |
| 0002 | $Y_0$ |
| 0003 | $K_0$ |
| 0004 | $C_1$ |
| 0005 | $M_1$ |
| 0006 | $Y_1$ |
| 0007 | $K_1$ |
| 0008 | $C_2$ |
| 0009 | $M_2$ |
| ⋮ | ⋮ |

IMAGE PROCESSING METHOD AND APPARATUS

This application is a continuation of application Ser. No 08/097,047 filed Jul. 27, 1993, now abandoned.

BACKGROUND OF THE INVENTION

1. Field of the Invention

The present invention relates to an image processing method and apparatus and, more particularly, to an image processing method and apparatus suitable for performing a color image process.

2. Related Background Art

Conventionally, as an apparatus of this type, a system consisting of, e.g., a host apparatus for transferring recording data to a recording apparatus, and a color ink jet recording apparatus for receiving the recording data from the host apparatus, and performing recording by depositing a plurality of color inks on a recording surface in accordance with the received data, is known.

In the host apparatus of this system, image data is normally processed as R, G, and B primaries since a user interactively processes the data using a display device, while in the recording apparatus, image data is normally processed as four, i.e., C, M, Y, and K colors since recording is performed using four color inks, i.e., C, M, Y, and K inks.

FIG. 2 is an explanatory view for explaining conversion of R, G, and B data into C, M, Y, and K data in a conventional system. Referring to FIG. 2, each of R, G, and B image data used for a display consists of 8 bits, and are input to a luminance-density conversion means 5. The R, G, and B image data are converted from luminance signals into density signals C, M, and Y. The converted density signals are input to a color correction means 6, and are converted into signals C', M', and Y' from which unnecessary absorption components of recording inks are corrected. The color-corrected data are input to an undercolor removal, black generating means 7, and are converted into 8-bit image data C", M", Y", and K". Furthermore, these image data are input to an output γ conversion means 8, thereby finally obtaining 8-bit image data C''', M''', Y''', and K'''.

However, in the above-mentioned system, the recording apparatus must perform a plurality of sequences described above for all pixels to be recorded, resulting in a long processing time and high cost.

SUMMARY OF THE INVENTION

It is an object of the present invention to solve each or all of the problems described above.

It is another object of the present invention to provide a method and apparatus, which can perform a color image process at high speed.

It is still another object of the present invention to provide an image processing method suitable for performing a color image process in a software manner.

In order to achieve the above objects, according to a preferred aspect of the present invention, there is disclosed an apparatus comprising first memorizing means for storing information according to input data, second memorizing means for storing an output signal obtained by performing processes of a plurality of procedures for the input data, comparison means for comparing new input data with the input data stored in the first memorizing means, and switching means for switching in accordance with an output from the comparison means if data is output after the processes of the plurality of procedures are performed, or if the data stored in the second memorizing means is output.

It is still another object of the present invention to provide a method and apparatus, capable of performing a high-speed process for pallet data.

In order to achieve the above object, according to another preferred aspect of the present invention, an index number defined by a first color system, and color information expressing a color indicated by the index number using a second color system are stored by causing the index number to correspond to the color information, and color information of the second color system is output in response to a designated index number.

Other objects and features of the present invention will become apparent from the following description of the embodiments taken in conjunction with the accompanying drawings.

BRIEF DESCRIPTION OF THE DRAWINGS

FIG. 7 is a view showing a data memorizing method of a memorizing means in the second embodiment of the present invention;

DESCRIPTION OF THE PREFERRED EMBODIMENTS (First Embodiment)

The first embodiment of the present invention will be described in detail below with reference to the accompanying drawings.

Figure 1:
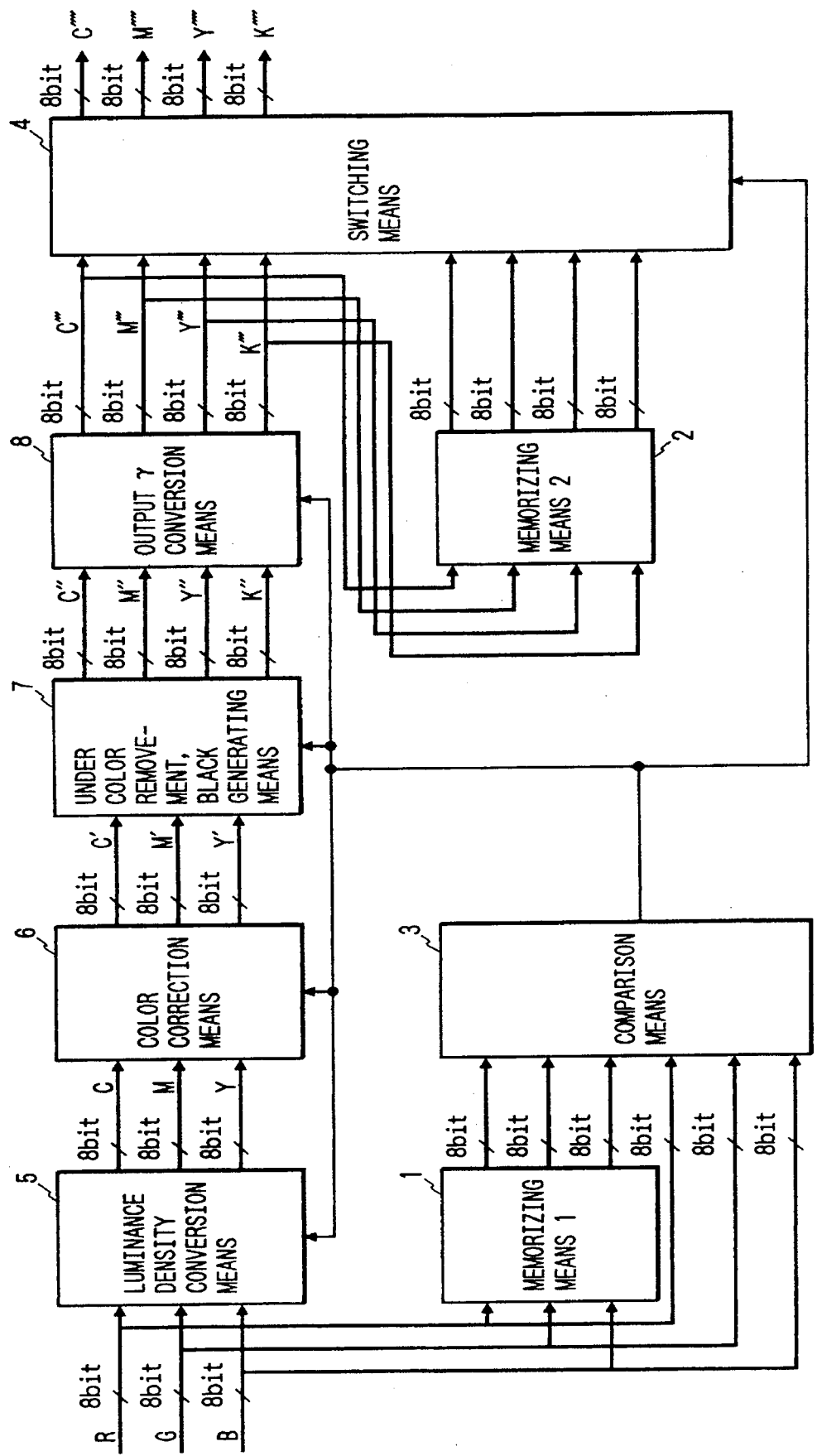
FIG. 1 is a block diagram showing an arrangement of an image processing system according to the first embodiment of the present invention.

FIG. 1 is a block diagram for explaining an arrangement of an image processing system according to the first embodiment of the present invention.

Referring to FIG. 1, data input from the left side are 8-bit R, G, and B data, i.e., full-color image data. The input data are simultaneously input to a first memorizing means 1, a luminance-density conversion means 5, and a comparison means 3. The first memorizing means 1 comprises a RAM (random-access memory), and stores input data. A second memorizing means 2 also comprises a RAM, and stores output data subjected to a series of processes of a plurality of procedures, as has been described above with reference to FIG. 2. The comparison means 3 compares currently input data with input data one pixel before, which are stored in the memorizing means 1. When the two data coincide with each other, the comparison means 3 outputs a coincidence signal to a switching means 4, the luminance-density conversion means 5, a color correction means 6, an undercolor removal and black generating means 7, and an output γ conversion means 8. The switching means 4 selects and outputs the output from the memorizing means 2 in response to the coincidence signal output from the comparison means 3. When no coincidence signal is output, the comparison means 3 selects and outputs the output from the output γ conversion means 8. The luminance-density conversion means 5 converts input R, G, and B image data from luminance signals to density signals C, M, and Y when no coincidence signal is output from the comparison means 3. The color correction means 6 converts the input density signals C, M, and Y into signals C', M', and Y' to which unnecessary absorption components of recording inks are corrected when no coincidence signal is output from the comparison means 3. The undercolor removal and black generating means 7 outputs image data C'', M'', Y'', and K' which consists of 8-bits respectively when no coincidence signal is output from the comparison means 3. The output γ conversion means 8 outputs final image data C''', M''', Y''' and K''' subjected to γ correction when no coincidence signal is output from the comparison means 3, and supplies them to the memorizing means 2 and the switching means 4.

Figure 3:
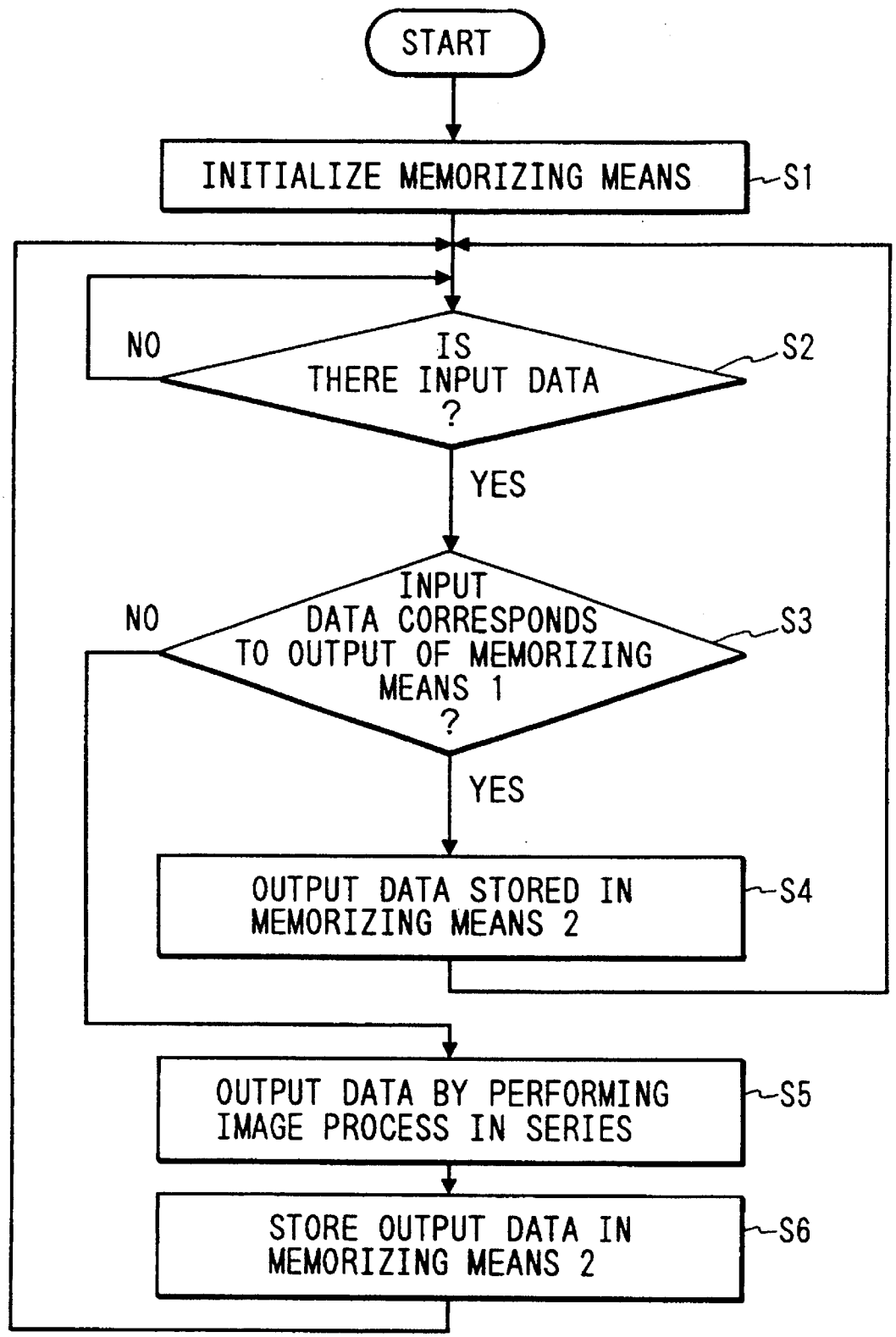
FIG. 3 is a flow chart showing a control sequence of the first embodiment.

FIG. 3 is a flow chart showing a process sequence of data in this embodiment. This system initializes the memorizing means 1 and 2 in step S1. In this embodiment, "255" is stored in all the R, G, and B values in the memorizing means 1, and "0" is stored in all the C, M, Y, and K values in the memorizing means 2, so that if R, G, and B inputs have a value "255", all C, M, Y, and K outputs are "0". The flow advances to step S2 to wait for data input. If data are input, the flow advances to step S3. On the other hand, if no data are input, step S2 is repeated until data are input. In step S3, input data are compared with data one pixel before stored in the memorizing means 1. If these data coincide with each other, the flow advances to step S4; otherwise, the flow advances to step S5. In step S4, since the currently input data are the same as data input one pixel before, a series of processes such as luminance-density conversion, color correction, and the like are not performed at all, and already processed data stored in the memorizing means 2 are output. Thereafter, the flow returns to step S2. On the other hand, in step S5, a series of processes such as luminance-density conversion, color correction, undercolor removal, black generation, output γ conversion, and the like are performed for input data to obtain output data. The flow then advances to step S6, and the output data are stored in the memorizing means 2. Thereafter, the flow returns to step S2. The above-mentioned operations are repeated.

Figure 4:
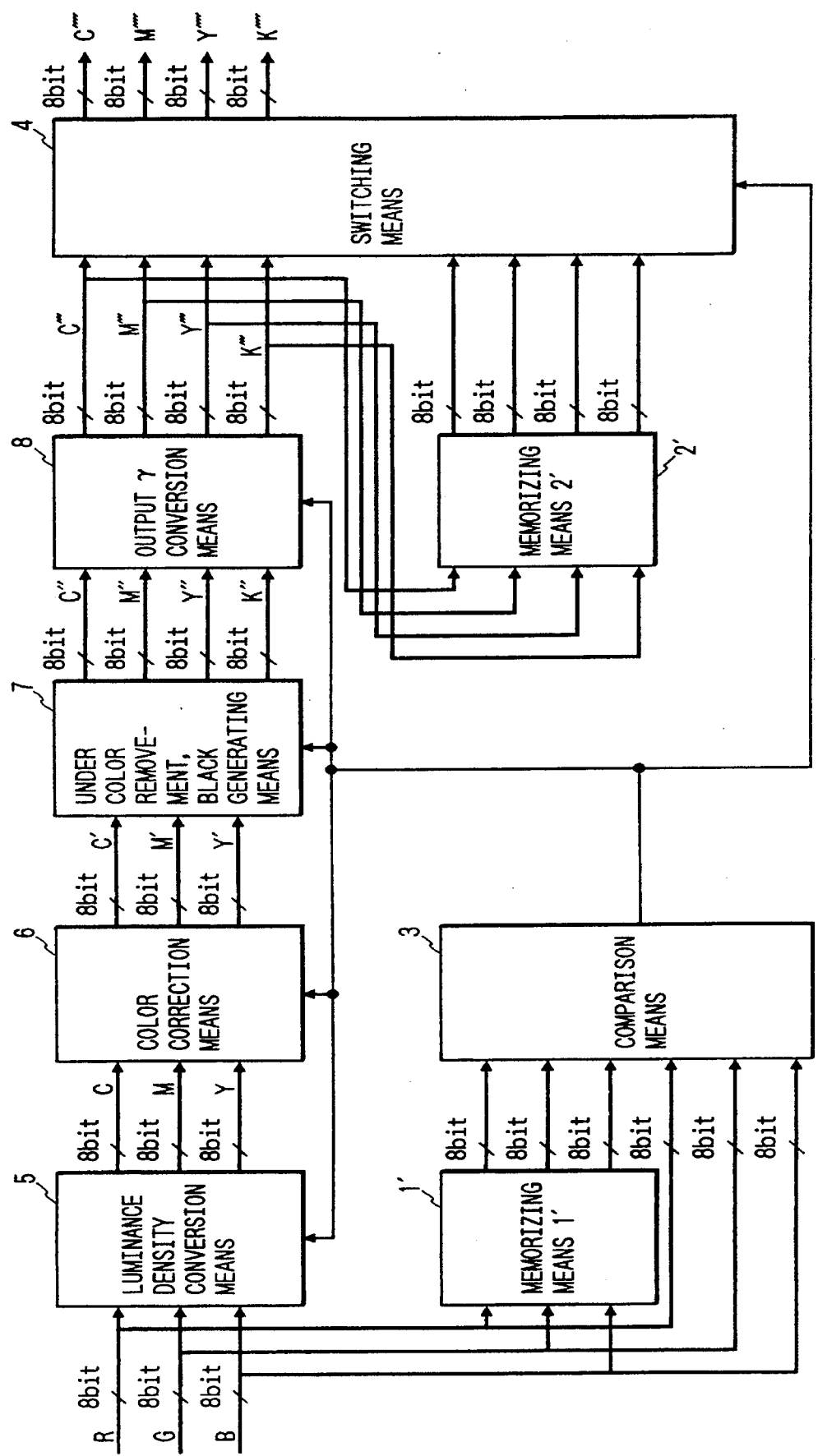
FIG. 4 is a block diagram showing an arrangement of an image processing system according to the present invention.

FIG. 4 is a block diagram showing an arrangement of an image processing system according to the present invention. In this embodiment, memorizing means 1' and 2' can store not only input/output data one pixel before but also a plurality of pixels. In response to a synchronization signal output from the memorizing means 1' to the memorizing means 2', data stored in the two memorizing means can be output in synchronism with each other. Thus, not only immediately preceding pixel but also a plurality of preceding pixels can be compared, and a probability of omitting a series of processes such as luminance-density conversion, color correction, and the like can be increased. When the number of the plurality of pixels is increased, the above-mentioned comparison operation is complicated, and the process speed is lowered. However, according to the first embodiment, such a problem can be solved, and a high-speed process can be realized.

As described above, unlike in a conventional system, a plurality of conversion processes such as luminance-density conversion, color correction, undercolor removal, black generation, output γ conversion, and the like are not required for each pixel, and a high-speed image processing system can be provided.

In the embodiment described above, each of input R, G, and B data consists of 8 bits, but may consist of other numbers of bits, e.g., 4 bits, 12 bits, 16 bits, and the like. Of course, each of C, M, Y, and K data to be output may consist of other numbers of bits. The comparison means and the switching means can be realized in a software manner based on an MPU (microprocessor unit) process. The memorizing means 1 and 2 may be realized using a single RAM. Although a series of processes include luminance-density conversion, color correction, undercolor removal, black generation, and output γ conversion in the above embodiment, other processes may be added. Also, the number of data to be output is not limited to four. In the arrangement shown in FIG. 4, the memorizing means for storing a plurality of pixel data may be rewritten in accordance with the frequency of input data.

As described above, according to this embodiment, the image processing system comprises the first memorizing means for storing input data, second memorizing means for storing output signals obtained by performing a series of processes for the same input data as in the first memorizing means, comparison means for comparing new input data with the input data stored in the first memorizing means, and switching means for switching in accordance with the output from the comparison means if the series of processes are performed, and data are output, or if the data stored in the second memorizing means are output. Thus, processes such as luminance-density conversion, color correction, undercolor removal, black generation, output γ conversion, and the like for each pixel can be omitted unlike in a conventional system, and a high-speed image processing system can be provided.

In this embodiment, a system having a hardware arrangement shown in FIG. 1 has been described. However, the present invention is not limited to this arrangement, and includes a case wherein the functions realized by the arrangement shown in FIG. 1 are obtained by a computer, registers, and a predetermined software program, as will be described later.

According to this embodiment, conversion processes of a plurality of procedures such as luminance-density conversion, color correction, undercolor removal, black generation, output γ conversion, and the like can be omitted, and a high-speed process can be performed.

Figure 10:
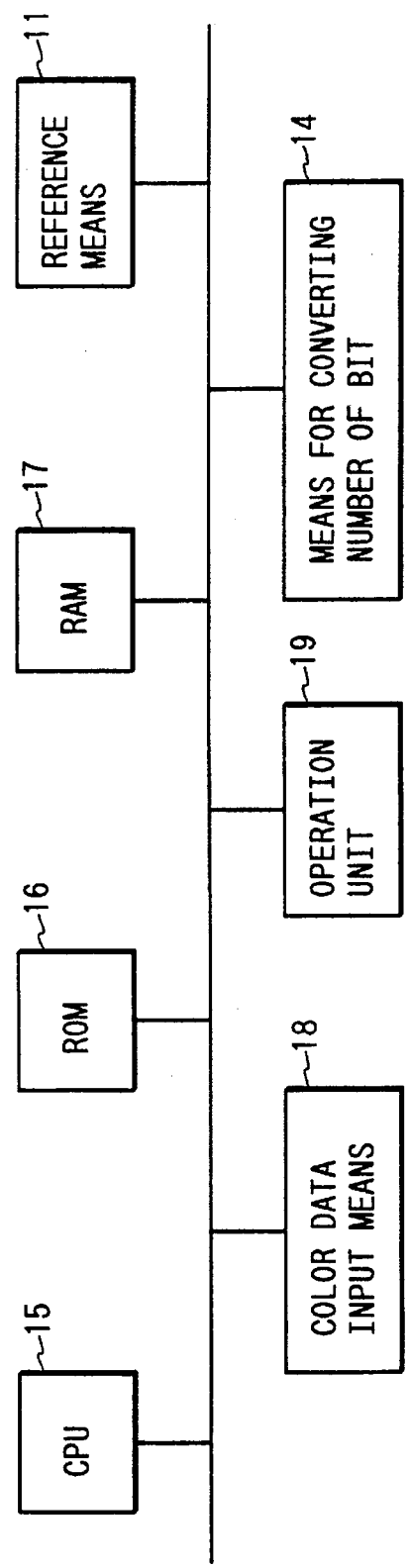
FIG. 10 is a block diagram showing an arrangement of an image processing apparatus of the third embodiment.

FIG. 10 is a block diagram showing an arrangement of an image processing apparatus for realizing the second and third embodiments to be described below.

Figures 5, 6:
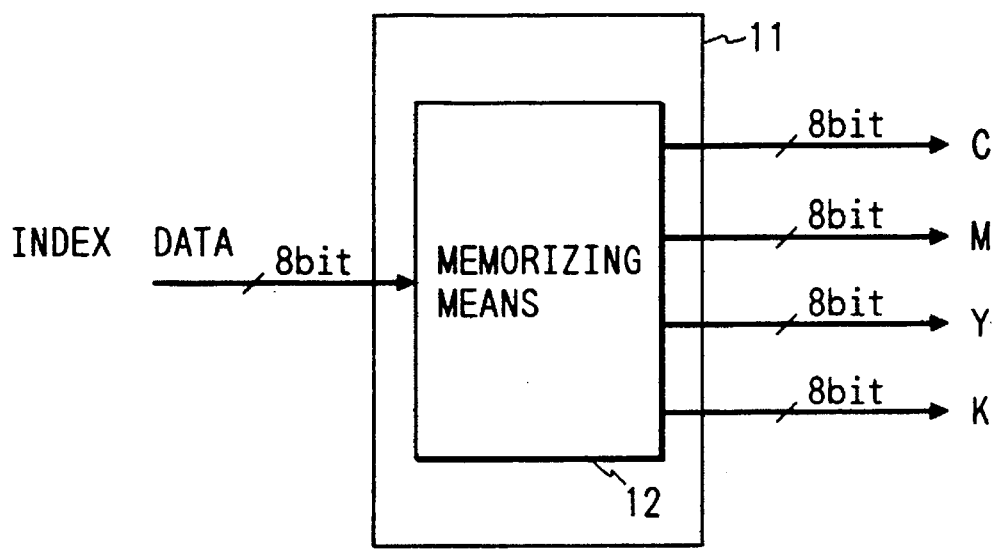
FIG. 5 is a block diagram showing an arrangement of an image processing apparatus of the first embodiment.
FIG. 6 is a table showing the relationship between index numbers and R, G, and B values.
Figure 9:
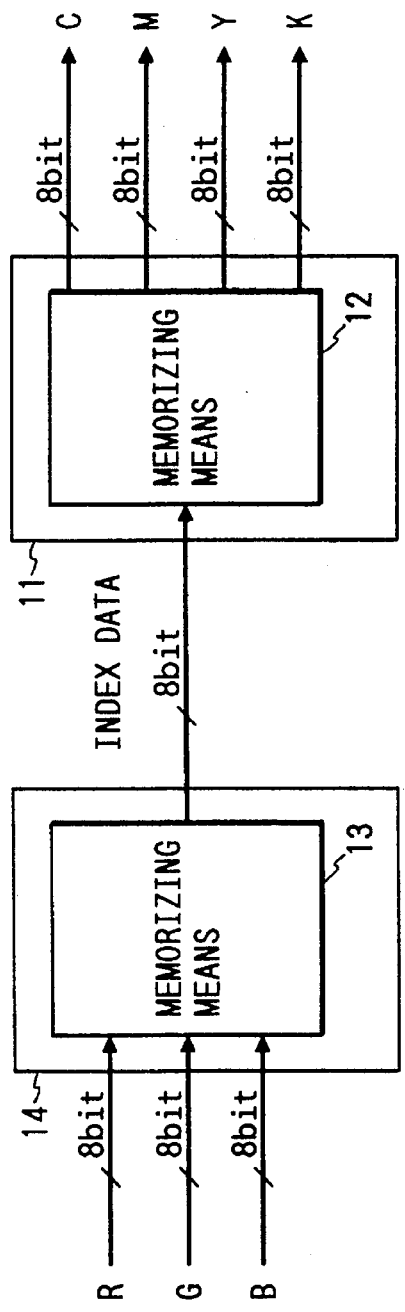
FIG. 9 is a block diagram showing an arrangement of an image processing system according to the third embodiment of the present invention.

Referring to FIG. 10, a reference means 11 and a means 14 for converting the number of bits are those to be described in the second and third embodiments, and are the same as those denoted by the same reference numerals in the block diagrams of FIGS. 5 and 9.

A CPU (central processing unit) 15 controls and executes processes of the apparatus according to a program stored in a ROM (read-only memory) 16. The ROM 16 stores a program shown in a flow chart to be described later, and can store various data (for example, a color information table corresponding to an index number (to be described later)). A RAM (random-access memory) 17 can store data obtained by processes to be described in this embodiment, and various other data. A color data input means 18 inputs R, G, and B color data and an index number from, e.g., a host computer. An operation unit 19 calculates a storage address of desired data in a memory on the basis of an index number, as shown in, e.g., FIG. 7.

Processes executed by the image processing apparatus shown in the block diagram of FIG. 10 will be described below as the second and third embodiments.

(Second Embodiment)

FIG. 5 is a block diagram for explaining an arrangement of an image processing system according to the second embodiment of the present invention.

Color data from a host computer (not shown) input by the color data input means 18 represents a specific color by an 8-bit index number. As shown in FIG. 6, 8-bit R, G, and B values are assigned to each index number in advance. With the arrangement shown in FIG. 6, 256 colors out of 16,777, 216 (=256$^3$) colors can be designated.

Referring to FIG. 5, the reference means 11 includes a memorizing means 12. The reference means 11 refers to the memorizing means (ROM 16) 12 in correspondence with an input index number, and obtains C, M, Y, and K 8-bit data outputs corresponding to the input index number, which data are pre-stored in the memorizing means (ROM 16) 12. The memorizing means 12 comprises, e.g., a RAM (random-access memory) or a ROM (read-only memory), and stores C, M, Y, and K values, which are obtained in advance as a result of a series of processes such as luminance-density conversion, color correction, undercolor removal, black generation, output γ conversion, and the like for R, G, and B values corresponding to index numbers, in the order of index numbers, as shown in FIG. 7.

Figure 8:
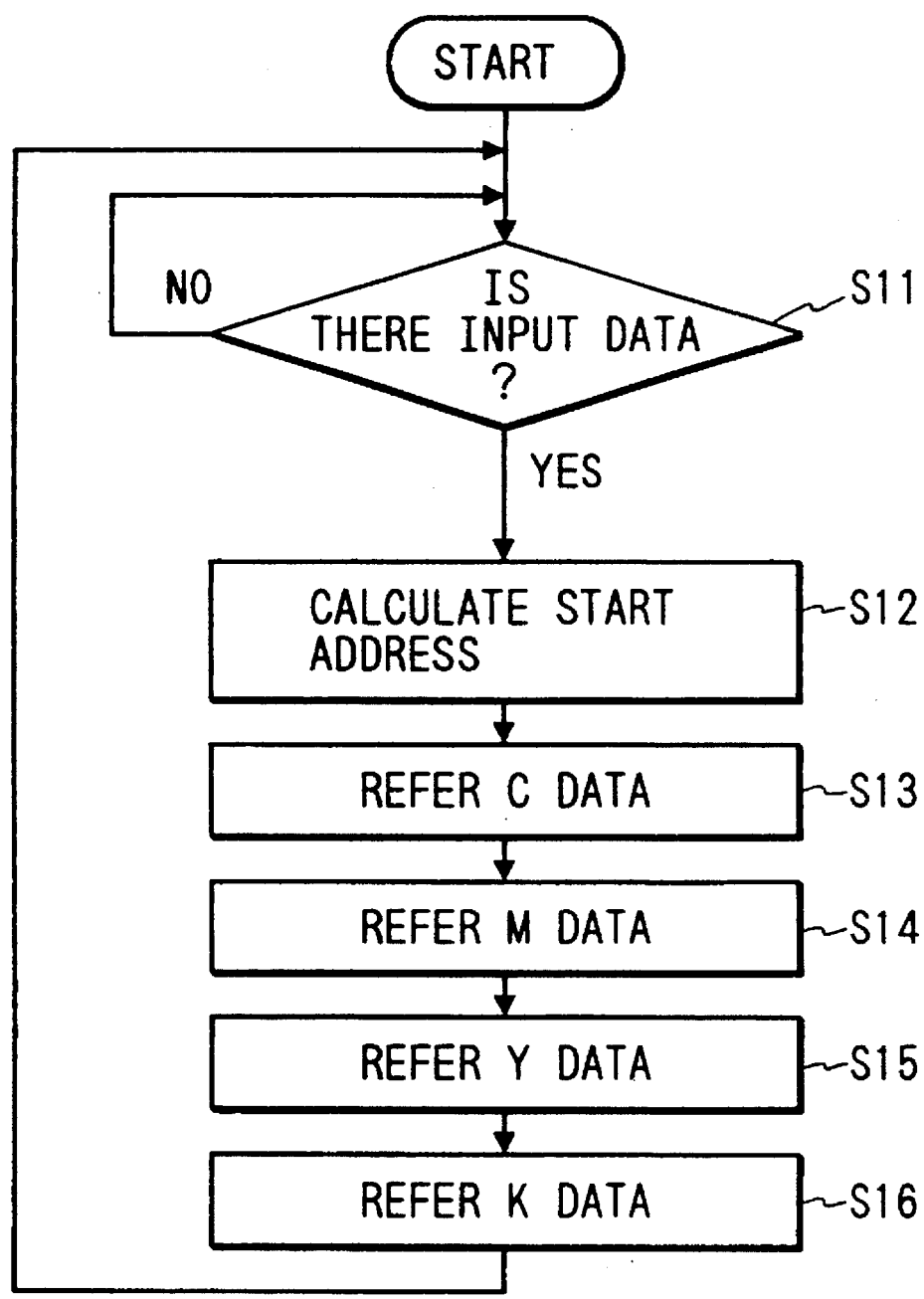
FIG. 8 is a flow chart showing a control sequence of the second embodiment.

FIG. 8 is a flow chart showing a data processing sequence in this embodiment. This system checks in step S11 if an index number is input to the color data input means 18. If YES in step S11, the flow advances to step S12. If NO in step S12, step S11 is repeated until YES is obtained in step S11. In step S12, the start address of the memorizing means (ROM 16) 12 to be referred to is calculated by the operation unit 19 on the basis of the input index number. In this embodiment, since data are stored as shown in FIG. 7, (an index number×4) corresponds to the start address to be obtained. The flow advances to step S13, and a C value is read out from the start address calculated in step S12. Furthermore, the flow advances to step S14, and the address is incremented by one to read out an M value. Similarly, the flow advances to step S15 to read out a Y value, and the flow then advances to step S16 to read out a K value. The flow returns to step S11, and the above-mentioned operation is repeated. The C, M, Y, and K values obtained in correspondence with the input index data are stored in the RAM 17, and are used in a latter print process.

(Third Embodiment)

FIG. 9 is a block diagram for explaining an arrangement of an image processing system according to the third embodiment of the present invention. In this embodiment, the means 14 for converting the number of bits including a memorizing means 13 is connected before the input of the second embodiment. According to this embodiment, the same effect as in the second embodiment can be obtained not only for 8-bit index data but also for a 24-bit full-color image consisting of R, G, and B 8-bit data as image data to be processed.

Referring to FIG. 9, image data input from the color data input means 18 is 24-bit full-color image data consisting of R, G, and B 8-bit data.

Referring to FIG. 9, the memorizing means 13 comprises, e.g., a RAM (random-access memory) 17 or a ROM (read-only memory) 16, and pre-stores R, G, and B 8-bit values corresponding to 256 index numbers shown in FIG. 6.

Referring to FIG. 9, the means 14 for converting the number of bits compares 24 bits of input R, G, and B data with 24 bits of each of 256 R, G, and B values stored in the memorizing means 13, and outputs an 8-bit index value having the closest value.

Note that 256 R, G, and B values stored in the memorizing means 13 may be predetermined default color values, but may be 256 color values having high frequencies of appearance obtained from a histogram of an image of interest to obtain a better result.

With the above-mentioned arrangement, 24-bit RGB image data is converted into 8-bit index image data, and then the same process as in the second embodiment can be performed.

In this manner, unlike in a conventional system, a plurality of conversion processes such as luminance-density conversion, color correction, undercolor removal, black generation, output γ conversion, and the like for each pixel are not required, and a low-cost, high-speed recording system can be provided.

In the embodiments described above, each of input R, G, and B data consists of 8 bits, but may consist of other numbers of bits, e.g., 12 bits, 16 bits, and the like. Of course, each of C, M, Y, and K data to be output or input R, G, and B data in the third embodiment may consist of other numbers of bits. The reference means and the means for converting the number of bits can be realized in a software manner based on an MPU (microprocessor unit) process. The memorizing means 12 and 13 in the third embodiment may be realized using a single RAM 17 or a ROM 16. Although processes to be performed in advance include luminance-density conversion, color correction, undercolor removal, black generation, and output γ conversion in the above embodiment, other processes may be added. Also, the number of data to be output is not limited to four.

As described above, according to this embodiment, an image processing system comprises memorizing means for storing data, which are obtained as a result of executing image processes for image data designated by index numbers, and reference means for referring to data from the memorizing means in correspondence with an input index number. With this arrangement, unlike in a conventional system, the image processing system does not require process means such as luminance-density conversion, color correction, undercolor removal, black generation, output γ conversion, and the like for each pixel, and a low-cost, high-speed recording system can be provided.

According to this embodiment, a plurality of conversion processes such as luminance-density conversion, color correction, undercolor removal, black generation, output γ conversion, and the like for each pixel are not required, and a low-cost, high-speed image processing method and apparatus can be provided.

What is claimed is:

1. An image processing apparatus comprising:

input means for inputting data in units of pixels of an image;

first memorizing means for storing a first input data corresponding to a single said pixel input by said input means;

processing means for performing a predetermined process utilizing said input data, and outputting a processed data;

second memorizing means for storing said processed data corresponding to said first input data;

comparison means for comparing a second input data corresponding to a pixel different from said pixel with said first input data stored in said first memorizing means at one time, said comparison means having an output indicative of a result of said comparing; and controlling means for controlling an output of said apparatus according to said output from said comparison means such that when said second input data differs from said first input data, the predetermined process is performed upon said second input data and said second input data is stored in said first memorizing means and processed data corresponding to said second input data is stored in said second memorizing means, and when said second input data does not differ from said input data, the data stored in said second memorizing means are output.

2. An apparatus according to claim 1, wherein said input data is R, G, and B data.

3. An apparatus according to claim 1, wherein said predetermined process includes a masking process for said input data.

4. An apparatus according to claim 1, wherein said predetermined process includes an undercolor removal process for said input data.

5. An image processing method comprising the steps of:

inputting data in units of pixels of an image;

storing a first input data corresponding to a single said pixel input in a first memorizing means in said inputting step;

performing a predetermined process utilizing said input data, and outputting a processed data;

storing said processed data corresponding to said first input data in a second memorizing means; and comparing a second input data corresponding to a pixel different from said pixel with said first input data stored in said first memorizing means to obtain a comparison result indicative of said comparison; and outputting the output signals which have been stored in said second memorizing means when said comparison result indicates that said second input data does not differ from said first input data, and when said comparison result indicates that said second input data differs from said first input data, the predetermined process is performed upon said second input data, and said second input data is stored in said first storing means and processed data corresponding to said second input data is stored in said second storing means.

6. A method according to claim 5, wherein said input data is R, G, and B data.

7. A method according to claim 5, wherein said predetermined process includes a masking process for said input data.

8. A method according to claim 5, wherein said predetermined process includes an undercolor removal process for said input data.

9. An image processing apparatus comprising:

input means for inputting an input data in units of pixels of an image;

first memorizing means for storing a first input data corresponding to a single said pixel;

second memorizing means for storing an output data corresponding to the single said pixel which have been obtained by performing a predetermined process utilizing the first input data;

comparison means for comparing a second input data corresponding to a pixel different from said pixel with the first input data obtained without searching from said first memorizing means, said comparison means having an output indicative of a result of said comparing; and output controlling means for controlling an output of said apparatus according to said output from said comparison means such that when said second input data differs from said first input data, the predetermined process is performed upon said second input data, and when said second input data does not differ from said input data, the output data stored in said second memorizing means are output.

10. An apparatus according to claim 9, wherein the input data is R, G, B data.

11. An apparatus according to claim 9, wherein the predetermined process includes a masking process for the input data.

12. An apparatus according to claim 9, wherein the predetermined process includes an undercolor removal process for the input data.

13. An image processing method comprising the steps of:

inputting an input data in units of pixels of an image;

storing a first input data corresponding to a single said pixel from said inputting in a first memorizing means;

storing an output data corresponding to the single said pixel which have been obtained by performing a predetermined process utilizing the first input data in a second memorizing means;

comparing a second input data corresponding to a pixel different from the pixel with the first input data obtained without searching from the first memorizing means to obtain a comparison result indicative of the comparison; and outputting the output signals which have been stored in said second memorizing means when said comparison result indicates that the second input data does not differ from the first input data, and when the comparison result indicates that the second input data differs from the first input data, performing the predetermined process upon the second input data.

14. A method according to claim 13, wherein the input data is R, G, B data.

15. A method according to claim 13, wherein the predetermined process includes a masking process for the input data.

16. A method according to claim 13, wherein the predetermined process includes an undercolor removal process for the input data.

* * * * *

UNITED STATES PATENT AND TRADEMARK OFFICE
CERTIFICATE OF CORRECTION

PATENT NO. : 5,610,997

DATED : March 11, 1997

INVENTORS : TAKATOSHI OHTA ET AL.

Page 1 of 2

It is certified that error appears in the above-identified patent and that said Letters Patent is hereby corrected as shown below:

ON TITLE PAGE, item

[56] References Cited:

"452159  6/1990 Japan" should read
       --4-52159  2/1992 Japan--.

IN THE DRAWINGS

Sheet 1 of 8,  FIG. 1, "REMOVE-MENT," should read
                    --REMOVAL,--.

Figure 2:
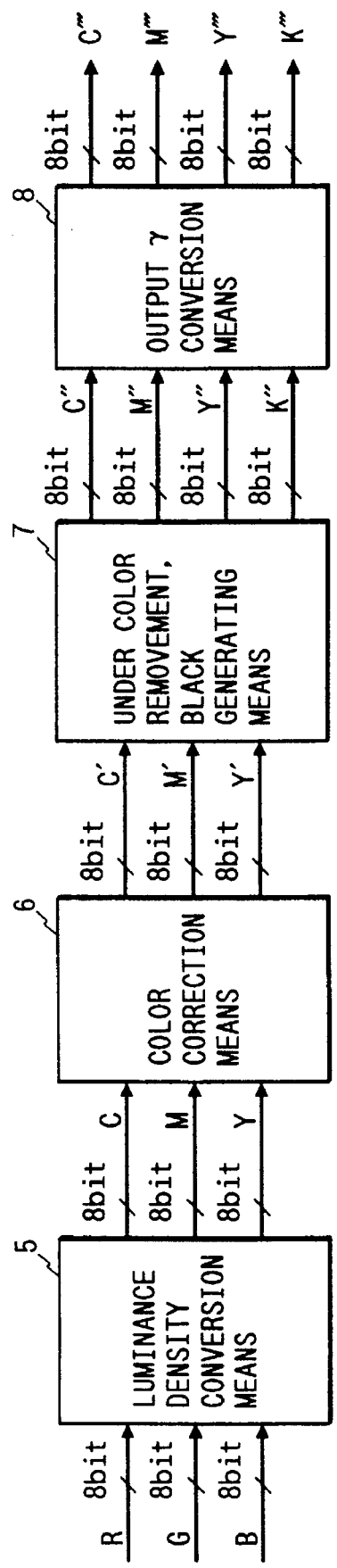
FIG. 2 is a block diagram showing an arrangement of a conventional image processing system.

Sheet 2 of 8,  FIG. 2, "REMOVEMENT," should read
                    --REMOVAL,--.

Sheet 4 of 8,  FIG. 4, "REMOVE-MENT," should read
                    --REMOVAL,--.

UNITED STATES PATENT AND TRADEMARK OFFICE
CERTIFICATE OF CORRECTION

PATENT NO. : 5,610,997

DATED : March 11, 1997

INVENTORS : TAKATOSHI OHTA ET AL.

It is certified that error appears in the above-identified patent and that said Letters Patent is hereby corrected as shown below:

<u>COLUMN 5</u>

Line 21, "(=2563)" should read --(=$256^3$)--.

Signed and Sealed this

Twenty-first Day of October 1997

BRUCE LEHMAN

*Attest:*

*Attesting Officer*     *Commissioner of Patents and Trademarks*